United States Patent
Yang et al.

(10) Patent No.: US 7,192,142 B2
(45) Date of Patent: Mar. 20, 2007

(54) WALL HANGING APPARATUS FOR PROJECTION APPARATUS

(75) Inventors: Chih Chung Yang, Miao-Li County (TW); Tung Hua Chou, Miao-Li County (TW)

(73) Assignee: Coretronic Corporation, Miao-Li County (TW)

( * ) Notice: Subject to any disclaimer, the term of this patent is extended or adjusted under 35 U.S.C. 154(b) by 120 days.

(21) Appl. No.: 10/952,802

(22) Filed: Sep. 30, 2004

(65) Prior Publication Data

US 2005/0264765 A1    Dec. 1, 2005

(30) Foreign Application Priority Data

May 28, 2004    (TW) ................ 93115439 A

(51) Int. Cl.
- *G03B 21/26* (2006.01)
- *G03B 21/28* (2006.01)
- *G03B 21/14* (2006.01)
- *G03B 21/22* (2006.01)
- *G03B 21/00* (2006.01)

(52) U.S. Cl. .................. 353/37; 353/119; 353/122

(58) Field of Classification Search ............ 353/30, 353/122, 66, 37, 98, 119, 12
See application file for complete search history.

(56) References Cited

U.S. PATENT DOCUMENTS

| | | | |
|---|---|---|---|
| 1,447,902 A * | 3/1923 | Sell | 362/322 |
| 3,940,209 A * | 2/1976 | Portner et al. | 353/79 |
| 6,357,886 B2 * | 3/2002 | Miyabukuro | 359/879 |
| 6,929,371 B2 * | 8/2005 | Saito | 353/122 |
| 2003/0234335 A1 * | 12/2003 | Umberg | 248/551 |
| 2004/0211872 A1 * | 10/2004 | Dittmer et al. | 248/323 |
| 2005/0035253 A1 * | 2/2005 | Rixom | 248/284.1 |
| 2005/0248729 A1 * | 11/2005 | Drucker et al. | 353/71 |

* cited by examiner

*Primary Examiner*—Melissa Jan Koval
*Assistant Examiner*—Andrew Kong
(74) *Attorney, Agent, or Firm*—Birch, Stewart, Kolasch & Birch, LLP

(57) ABSTRACT

A wall hanging apparatus for a projection apparatus comprises a fixing seat installed at the lower surface of the projection apparatus, supporting arm whose lower end is fixed on the surface of the fixing seat and reflection mirror fixed at the upper end of the supporting arm and corresponded to a projection lens of the projection apparatus. Whereby, the projection apparatus can have both the portability of a prone type projection apparatus and space saving characteristic of a ceiling hanging type projection apparatus and can be used in an indoor space with a lower height to allow the usage of the projection apparatus is diversified. And, a trapezoid deformation of an image caused from the deviation of the angle of incidence can be modified effectively and quickly by adjusting the angle of the reflection mirror.

16 Claims, 6 Drawing Sheets

WALL HANGING APPARATUS FOR PROJECTION APPARATUS

This Nonprovisional application claims priority under 35 U.S.C. § 119(a) on Patent Application No(s). 093115439 filed in Taiwan, Republic of China on May 28, 2004, the entire contents of which are hereby incorporated by reference.

BACKGROUND OF THE INVENTION

1. Field of the Invention

The present invention relates to a wall hanging apparatus for a projection apparatus, and more particularly to a wall hanging apparatus used to fix a projection apparatus on the surface of a vertical wall and allow images emitted from the projection apparatus to be controlled to project onto the surface of an appointed screen.

2. Description of Related Art

The projection types of traditional front projection type projection apparatuses can be divided into a prone type and a ceiling hanging type. The prone type projection apparatus is convenient in carrying but needs to be placed levelly on a table surface while projecting. And, because a proper distance must be kept between the projection apparatus and a projected surface, if the space of a tabletop or meeting room is smaller, the arrangement of the meeting room and the seats of meeting participators must always be changed to accommodate to the placing location of the projection apparatus; the process for it is time consuming and troublesome. As to the ceiling hanging type projection apparatus, because it is hung on a ceiling, the arrangement of a meeting room and the seats of meeting participators do not need to be accommodated to the position of the projection apparatus. However, the ceiling hanging type projection apparatus must be fixed on a ceiling in advance to match with an indoor decoration when it is being progressed. Once the installment of the ceiling hanging type projection apparatus is completed, it cannot be detached or the projection angle thereof cannot be micro-adjusted at will. If the deviation of the projection angle leading to the yielding of th trapezoid deformation of the performed image is found, the image deformation is unable to be corrected manually quickly. Besides, such kind of the ceiling hanging type projection apparatus is unable to be installed on a ceiling with a lower height.

The present invention is proposed to solve the deficiencies mentioned above to allow a projection apparatus to have the advantages of both prone type and ceiling hanging type projection apparatuses and the deformation of the projected image to be able to be corrected quickly.

SUMMARY OF THE INVENTION

The main object of the present invention is to provide a wall hanging apparatus for a projection apparatus, doing away with the situation that a general projection apparatus can only be placed on a plane or hung on a ceiling to process projection and allowing a projection apparatus to have both of the probability of a prone type projection apparatus and space saving characteristic of a ceiling hanging type projection apparatus and to be put into practice in a indoor space with a lower height so as to increase the usage occasions of the projection apparatus by hanging the projection apparatus on a wall.

Another object of the present invention is to provide a wall hanging apparatus for a projection apparatus, capable of revising the trapezoid deformation of images caused from the deviation of the incident angle effectively and fast by means of an angle adjustable reflection mirror.

Still another object of the present invention is to provide a wall hanging apparatus for a projection apparatus, allowing the wall hanging apparatus to be adapted to every kind of market available projecting apparatus in which the position of a lens is different by adjusting a displacement supporting arm.

For attaining to the objects mentioned above, a wall hanging apparatus for a projection apparatus, which is mainly used on a projection apparatus, comprises a fixing seat, supporting arm and reflection mirror, in which a bearing sheet is disposed at the upper surface of the fixing seat, the fixing seat can be fixed at the lower surface of the projection apparatus through the bearing sheet. Besides, sliding rails are disposed at the lower surface of the fixing seat, the projection apparatus can be fixed on a wall effectively by engaging the sliding rails within sliding grooves on the surface of a saddle pad fixed on the surface of a wall.

In addition, a long through hole is open in the bearing sheet for fixing and locking the lower end of the supporting arm to the surface of the bearing sheet. Besides, an angle adjustable reflection mirror, which is corresponding to the lens of the projection apparatus, is installed at the upper end of the supporting arm. The beam emitted from the projection apparatus can be reflected by the reflection mirror and then projected onto a screen. Therefore, the trapezoid deformation of the images on the screen can be further revised by adjusting the angle of the reflection mirror to cause the incident angle of the beam to be changed.

BRIEF DESCRIPTION OF THE DRAWINGS

The present invention can be more fully understood by reference to the following description and accompanying drawings, in which.

DETAILED DESCRIPTION OF THE PREFERRED EMBODIMENTS

Figure 1:
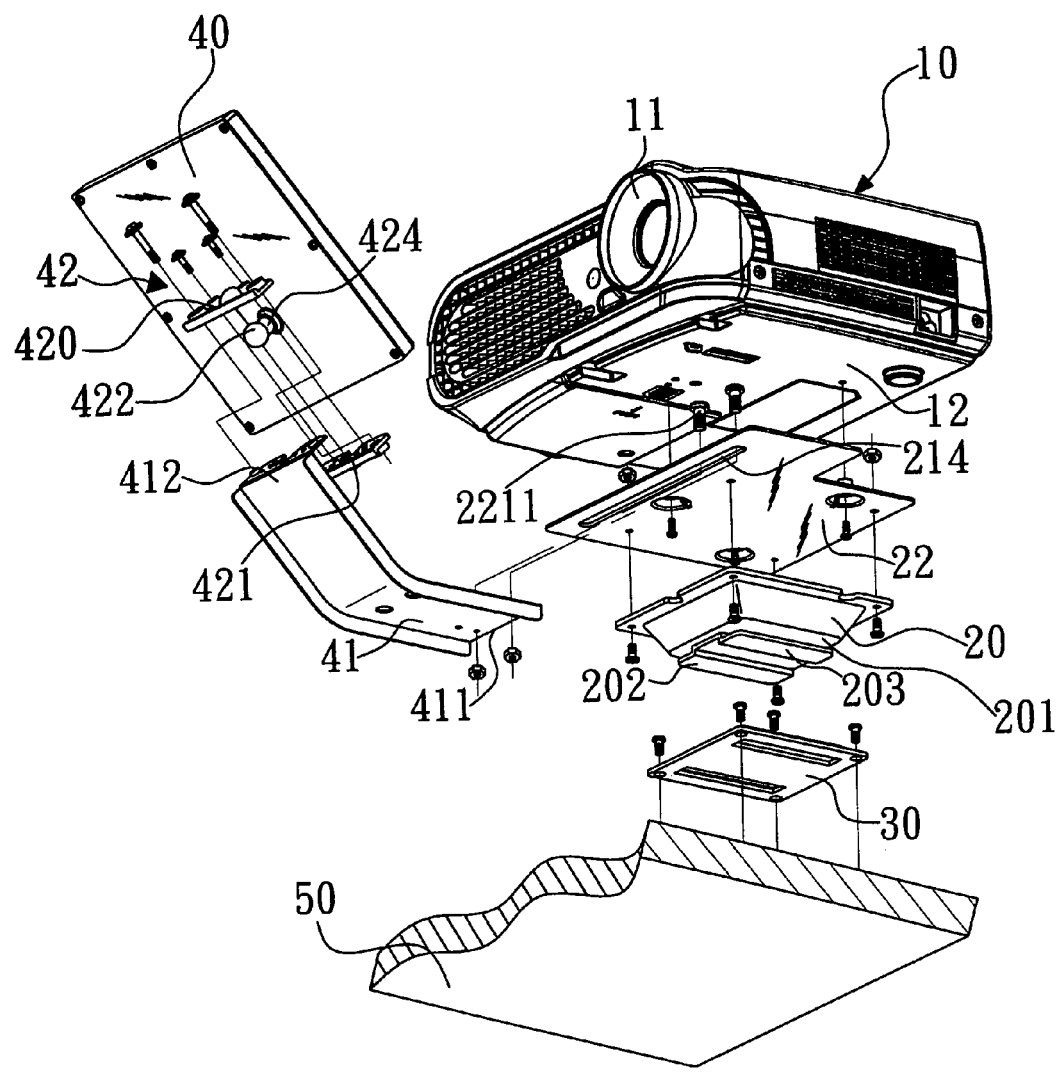
FIG. 1 is an explosive view, showing a wall hanging apparatus for a projection apparatus of a preferred embodiment of the present invention and a projection apparatus combined therewith.
Figure 2:
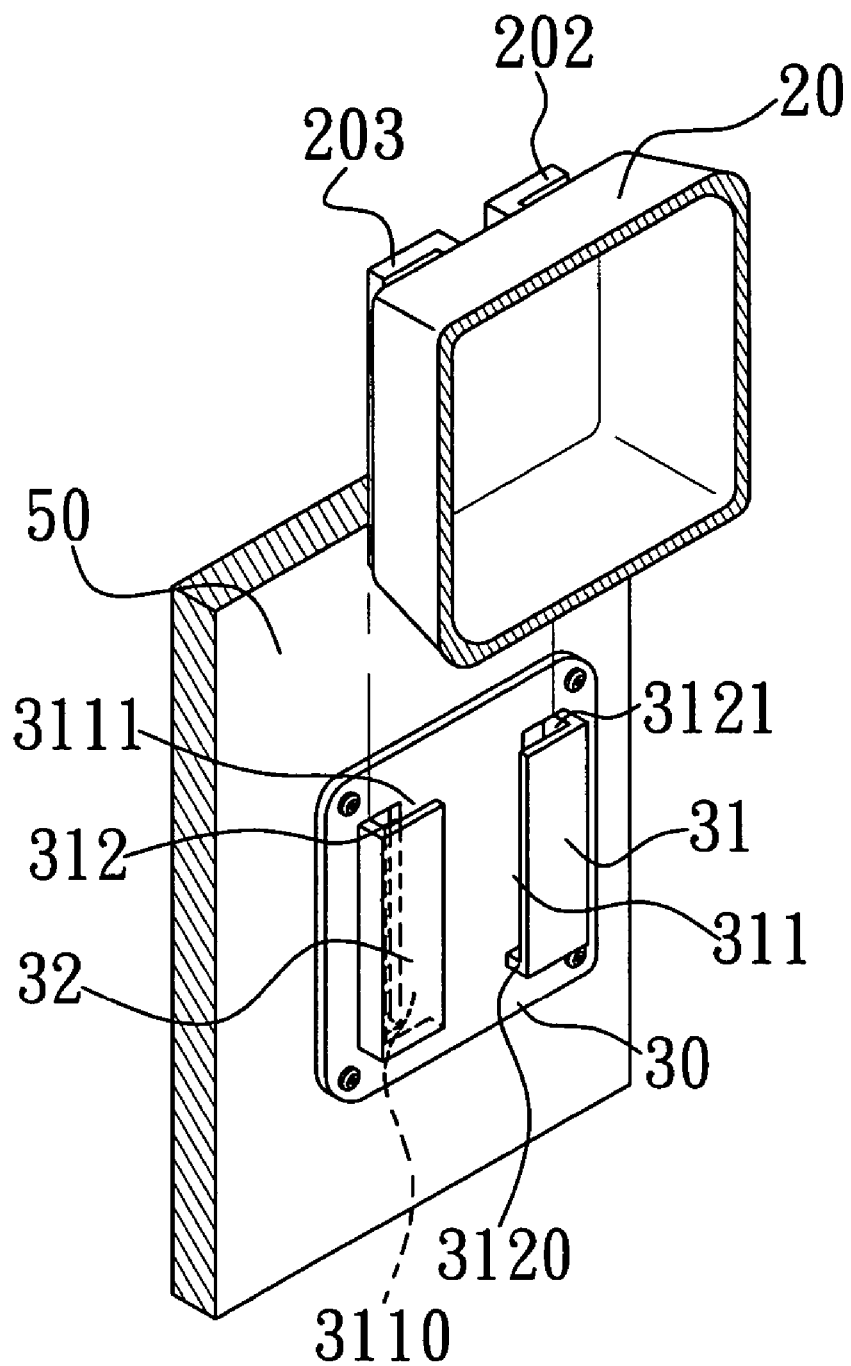
FIG. 2 is a prospective view, showing a fixing seat of a wall hanging apparatus for a projection apparatus according to the present invention.

Please refer to FIGS. 1 and 2. A wall hanging apparatus for a projection apparatus comprises a fixing seat 20, supporting arm 41 and reflection mirror 40, in which a bearing sheet 22 is fixed on the surface of the fixing seat 20 and used to combine with a lower surface 12 of a projection apparatus 10. Sheet type sliding rails 202 and 203 with a dovetail shape is extended from the lower surface 201 of the fixing seat 20. The sliding rails 202 and 203 can be directly slid into a set of sliding grooves formed by sheet 31 and 32 with a dovetail shape disposed on a saddle pad 30 installed on the vertical wall surface 50 in advance as FIG. 2 shows. That is to say, the sheet type sliding rails 202 and 203 of the fixing seat 20 are slid respectively into the sliding grooves 311 and 312 via the upper ends 3111 and 3121 of the sliding grooves 311 and 312 and stopped respectively at the closed ends of the sliding grooves 311 and 312 so as to cause the projection apparatus 10 fixed on the bearing sheet 22 of the fixing seat 20 to be fixed at the lower ends 3110 and 3120 of the sliding grooves 311 and 312 through the sliding rails 202 and 203 of the fixing seat 20. Whereby, the projection apparatus 10 fixed on the fixing seat 20 can be hung and fixed on the vertical wall surface 50.

Figure 3:
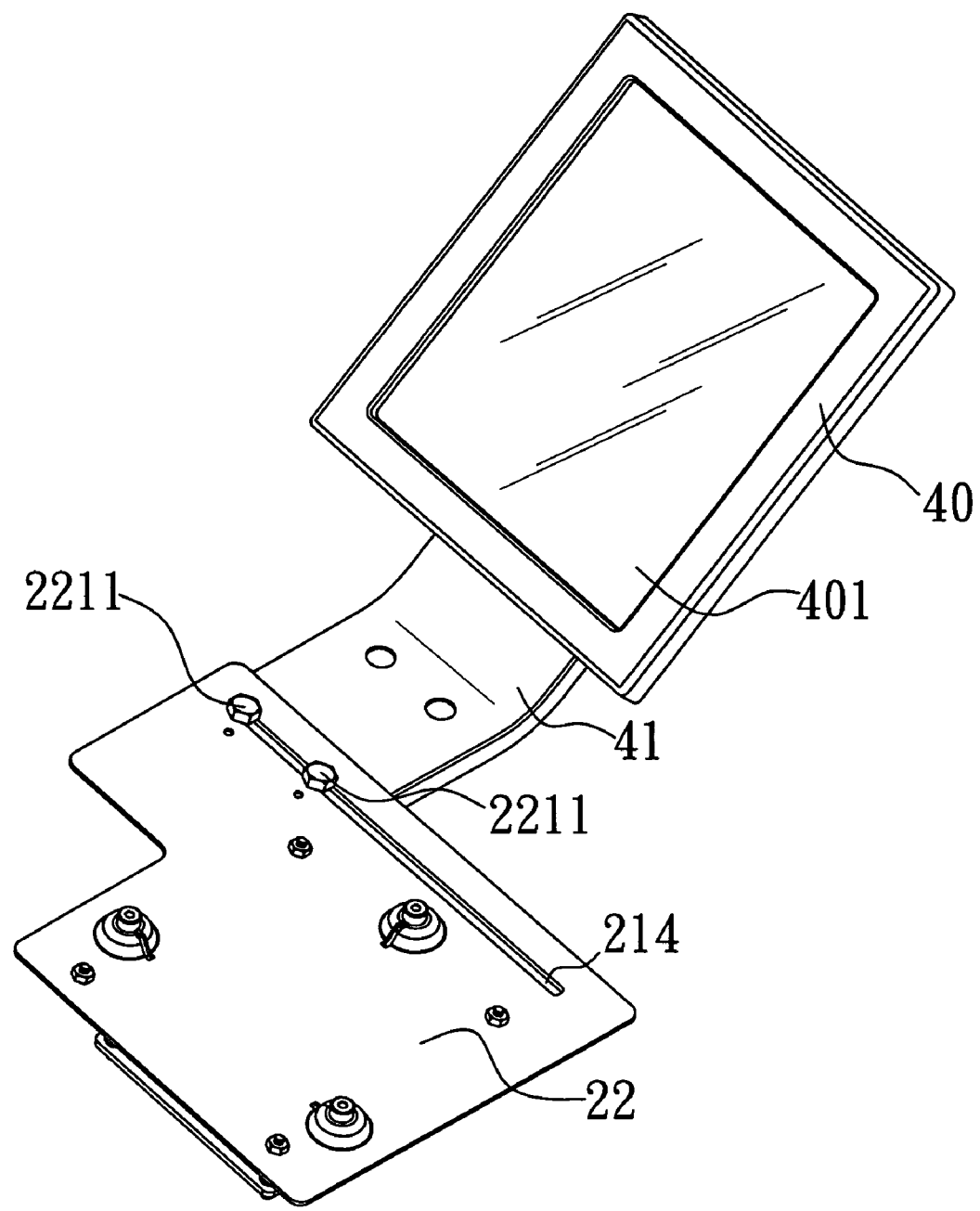
FIG. 3 is a prospective view, showing a wall hanging apparatus of a preferred embodiment according to the present invention.
Figure 4:
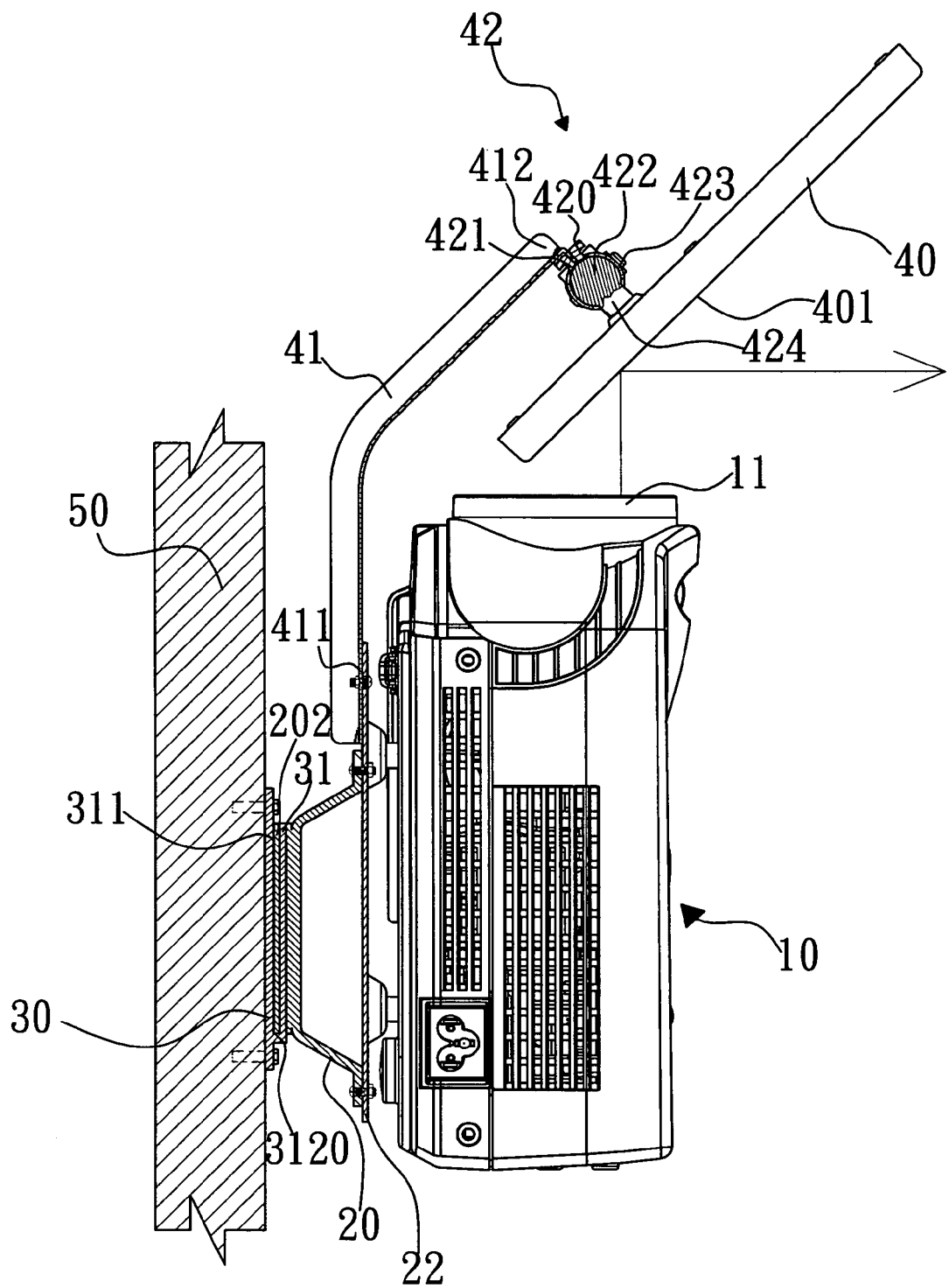
FIG. 4 is a schematic view, showing that a wall hanging apparatus of a preferred embodiment of the present invention is hung on a wall.

Please refer to FIGS. 3 and 4. A long through hole 214 is disposed at the edge of the bearing sheet 22 of the fixing seat 20. A lower end 411 of the supporting arm 41 can be fixed at the lower surface of the bearing sheet 22 with locking elements 2211 through the long through hole 214. Thus, the lower end 411 of the supporting arm 41 is fixed on an upper surface of the fixing seat 20 via the bearing sheet 22. Furthermore, a ball-and-socket joint 42 is disposed at the upper end 412 of the supporting arm 41. A socket 423 of the joint 42 is formed by clamping and fixing upper and lower clamping sheets 420 and 421 at the upper end 412 of the supporting arm 41. The socket 423 allows a ball 422 to be rolled therein and an adjusting rod 424 is extended from and fixed at the surface of the ball 422. Another end of the adjusting rod 424 is directly fixed to the back surface of a reflection mirror 40 corresponding to a lens 11 of the projection apparatus 10. Therefore, a beam emitted from the lens 11 is reflected with an angle by a reflection surface 401 of the reflection mirror 40 so that the beam can be controlled to project onto an appointed screen.

Figure 5:
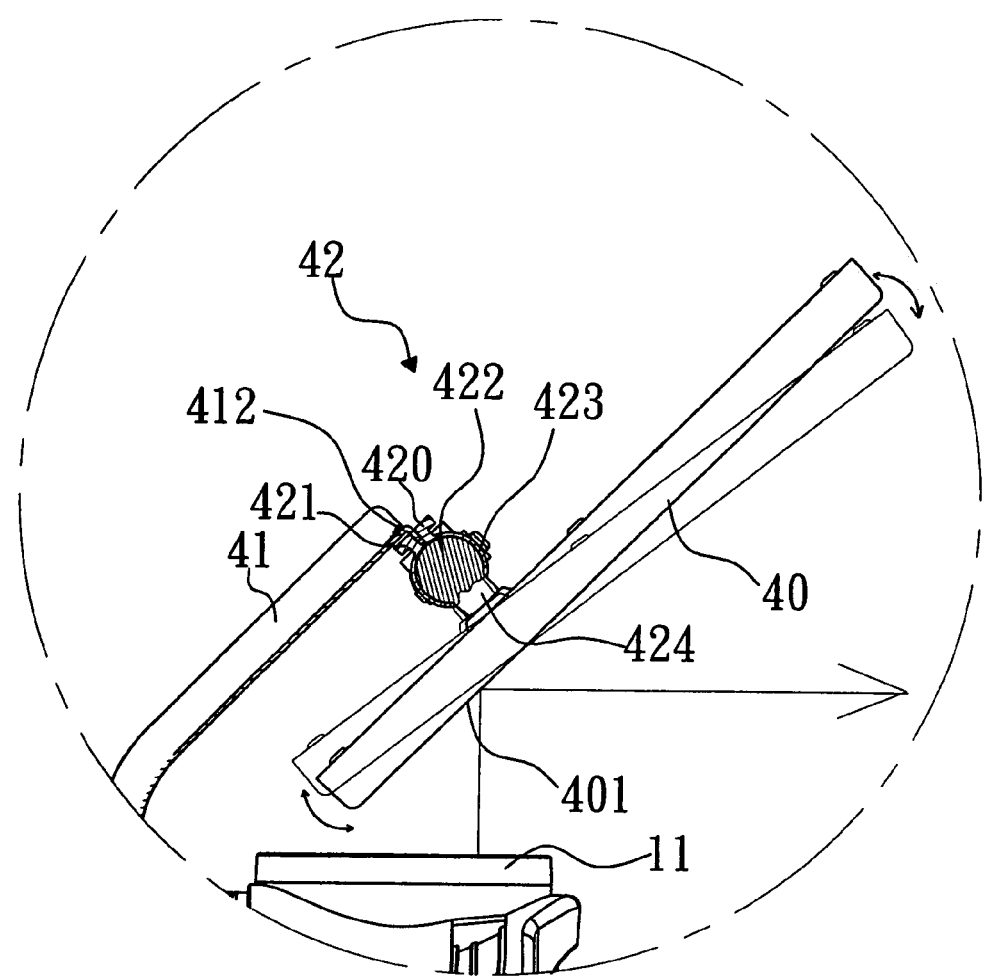
FIG. 5 is a schematic view, showing the amplification of a ball-and-socket joint of a wall hanging apparatus of a projection apparatus according to the present invention.

Please refer to FIGS. 4 and 5. The saddle pad 30 must be installed on a vertical wall surface 50 in advance before the wall hanging apparatus according to the present invention is hung on the wall 50. Thereafter, the dovetail sheet sliding rails 202 and 203 extended from the fixing seat 20 fixed on the lower surface of the projector 10 is slid into the sliding grooves 311 and 312 on the surface of the saddle pad 30 fixed on the vertical wall surface 50. In the meantime, the lower ends of the sliding rails 202 and 203 are pressed down by the dead weight of the projection apparatus 10 to the positions at the closed lower ends 3110 and 3120 of the sliding rails 311 and 320 and the wall hanging structure is then fixed on the wall. If the projector 10 hung on the wall wants to be detached, only push the sliding rails 202 and 203 of the fixing seat 20 positioned at the closed lower ends 3110 and 3120 of the sliding grooves 311 and 312 out of the sliding grooves 311 and 312 in a reverse direction, and the projection apparatus 10 can then be detached quickly. Therefore, the projection apparatus 10 can be mounted onto or detached from a vertical wall surface by means of the wall hanging apparatus. Whereby, the inconveniences of the mounting, the detaching and the carrying of the conventional ceiling hanging can be effectively solved.

Please refer to FIGS. 4 and 5. A beam emitted from the lens 11 of the projector 10 can be reflected with an angle by a reflection surface 401 of the reflection mirror 40 kept at a position corresponding to the lens 11 to cause the beam to be projected onto a screen through the reflection mirror 40. From the description mentioned above, it is obvious that the main effect of the reflection mirror 40 is to control the incident angle that the central optical axis of a beam is projected onto a screen. Therefore, when the incident angle between the central optical axis reflected from the reflection surface 401 and a projection surface is exactly 90°, the formed images are all normal images; if the incident angle between the reflected central optical axis and the projection surface is more or less than 90°, the image formed on the projection surface are longitudinal or transversal deformed trapezoid images. At this time, the angle of the central optical axis reflected from the reflection surface 401 must be further adjusted by adjusting the angle of the reflection surface 401 of the reflection mirror 40 to attain to the modification of the deformation of the images. Therefore, according to the present invention, the reflection mirror 40 is fixed by the adjusting rod 424 extended from the surface of the ball 422 in the ball-and-socket joint 42. A user only rotates the reflection mirror 40 directly while observing the state and degree of the deformation of the formed image, and the adjusting rod 424 of the reflection mirror 40 is allowed to drive the ball 422 synchronically to be rotated in the socket 423 to cause the reflection mirror 40 to swing in various angles transversely or longitudinally. Therefore, the central optical axis reflected from the reflection mirror 401 can be projected onto the screen with an angle equal to or close to 90° by adjusting and modifying the trapezoid deformation yielded from the incident angle of the central optical axis.

Figure 6:
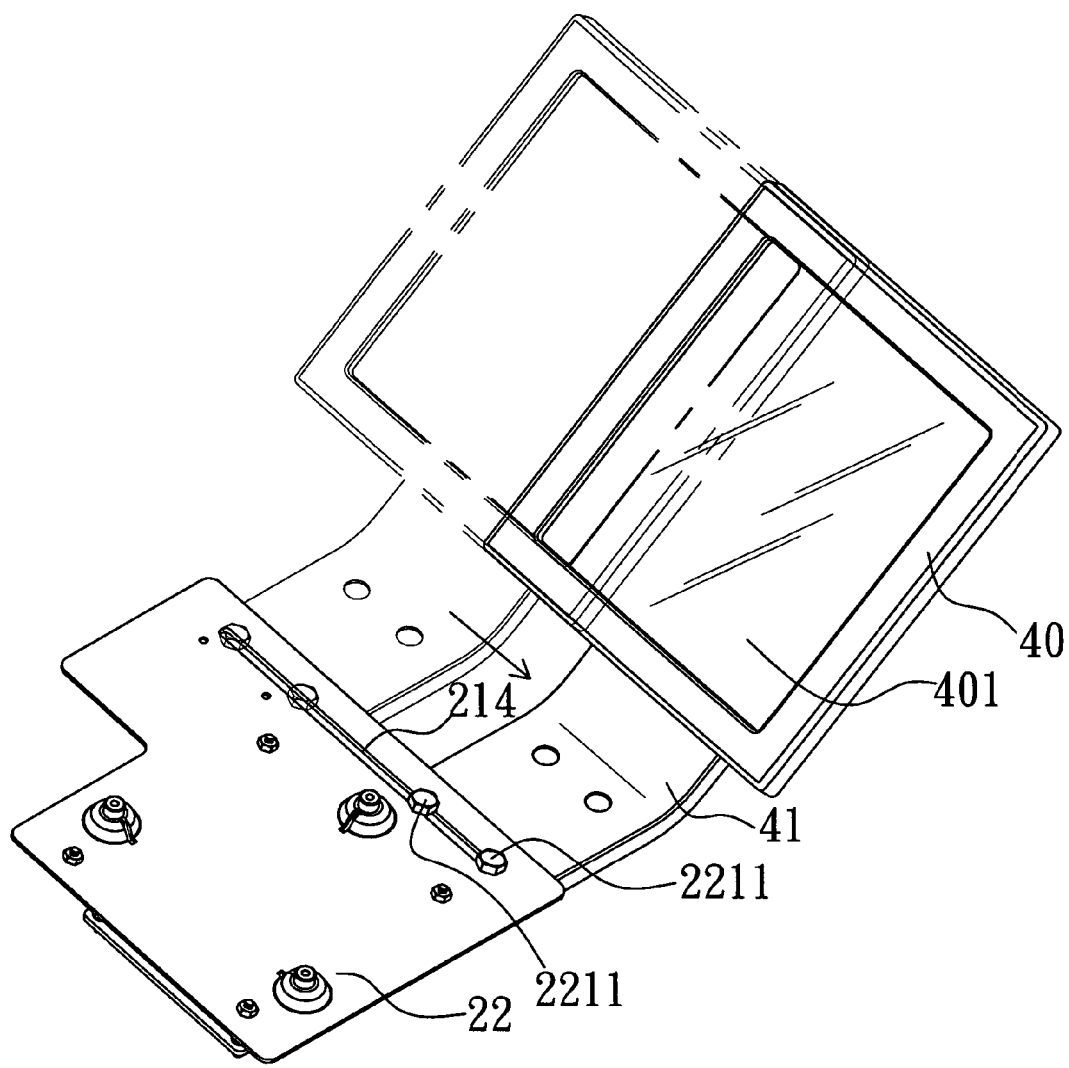
FIG. 6 is a schematic view, showing the position adjustment of a supporting arm in the reflection mirror of a wall hanging apparatus for a projection apparatus of a preferred embodiment of the present invention.

Please refer to FIG. 6. The installment position of a lens on each of a variety of projection apparatuses available in the market is different. The supporting arm 41 for the reflection mirror 40 can be adjusted depending on the installment position of the lens 11 of the projection apparatus to cause the reflection mirror 40 to be kept at a corresponding state with the lens 11. Only a fixing element 2211 used for fixing the supporting arm 41 on the bearing sheet 22 and disposed at the lower end 411 of the supporting arm 41 is slightly loosed while adjusting, the fixing element 221 is then slid in the long through hole 214. Furthermore, the fixing element 2211 is locked and fixed again after the adjustment of the supporting arm 41 is completed to allow the supporting arm 41 fixed on the bearing sheet 22 once more and to cause the reflection mirror 40 to be able to be kept at a corresponding state with the lens 11 of the projection apparatus 10. The dotted and continuous lines in the figure respectively show the positions of the reflection mirror 40 before and after adjusting.

From the description mentioned above, the merits of the present invention are: hanging a projection apparatus on a vertical wall surface can have not only the portability of a prone type projection apparatus but also the space saving characteristic of a ceiling hanging projection apparatus so that the projection apparatus can be used in a lower or smaller indoor space and adjusting the incident angle that a central optical axis of a beam is projected onto a screen through an adjustable reflection mirror can modify the trapezoid deformation of images quickly so that the quality projected images can be enhanced.

It is noted that the wall hanging structure for a projection apparatus described above is the preferred embodiments of the present invention for the purpose of illustration only, and are not intended as a definition of the limits and scope of the invention disclosed. Any modifications and variations that may be apparent to a person skilled in the art are intended to be included within the scope of the present invention.

What is claimed is:

1. A wall hanging apparatus for a projection apparatus, comprising:

a fixing seat, fixed at a lower surface of said projection apparatus;

a supporting arm, a lower end thereof being fixed on an upper surface of said fixing seat;

a reflection mirror, fixed at an upper end of said supporting arm and corresponding to a lens of said projection apparatus, images provided from said lens of said projection apparatus being reflected onto a screen through said reflection mirror; and a set of sheet sliding rails, extended from a lower surface of said fixing seat, wherein said sliding rails are slid on a saddle pad, and a set of sliding grooves formed by sheets is disposed on a surface of said saddle pad for said sliding rails to be slid and stayed therein, and wherein an opening is opened at an upper end of said sliding grooves in said saddle pad and a lower end thereof is closed.

2. The wall hanging apparatus according to claim 1, wherein a ball-and-socket joint is fixed on the upper end of said supporting arm and an adjusting rod is extended from a surface of a ball of said ball-and-socket joint for fixing said reflection mirror to allow said reflection mirror to make a multi-angular rotation adjustment through said ball-and-socket joint.

3. The wall hanging apparatus according to claim 2, wherein a socket of said ball-and-socket joint is formed by clamping and fixing an upper clamping sheet and a lower clamping sheet at the upper end of said supporting arm to allow said ball to be rotated in said socket.

4. The wall hanging apparatus according to claim 1, wherein said sheet sliding rails on fixing seat and said sliding grooves in said saddle pad are respectively dovetail pieces and grooves.

5. A wall hanging apparatus for a projection apparatus, comprising:

a fixing seat;

a bearing sheet, having a long through hole, fixed on an upper surface of said fixing seat, fixing said fixing seat on a lower surface of said projection apparatus through said bearing sheet;

a supporting arm, a lower end thereof being fixed on an upper surface of said bearing sheet by passing locking elements through said long through hole or moving the lower end of said supporting arm under a lower surface of said bearing sheet by sliding said locking elements in said long through hole so that the position of the lower end of said supporting arm is adjusted to match up with the position of a lens of said projection apparatus; and a reflection mirror, fixed at an upper end of said supporting arm and corresponding to said lens, images provided from said lens of said projection apparatus being reflected onto a screen through said reflection mirror.

6. The wall hanging apparatus according to claim 5, wherein a set of sheet sliding rails is extended from the lower surface of said fixing seat.

7. The wall hanging apparatus according to claim 5, wherein said sliding rails are slid on a saddle pad, a set of sliding grooves formed by sheets is disposed on a surface of said saddle pad for said sliding rails to be slid and stayed therein.

8. The wall hanging apparatus according to claim 7, wherein an opening is opened at an upper end of said sliding grooves in said saddle pad and a lower end thereof is closed.

9. The wall hanging apparatus according to claim 5, wherein a ball-and-socket joint is fixed on the upper end of said supporting arm and an adjusting rod is extended from a surface of a ball of said ball-and-socket joint for fixing said reflection mirror to allow said reflection mirror to make a multi-angular rotation adjustment through said ball-and-socket joint.

10. The wall hanging apparatus according to claim 9, wherein a socket of said ball-and-socket joint is formed by clamping and fixing an upper clamping sheet and a lower clamping sheet at the upper end of the supporting arm to allow said ball to be rotated in said socket.

11. The wall hanging apparatus according to claim 5, wherein said sheet sliding rails on fixing seat and said sliding grooves in said saddle pad are respectively dovetail pieces and grooves.

12. A wall hanging apparatus for a projection apparatus, comprising:

a fixing seat, fixed at a lower surface of said projection apparatus;

a supporting arm, a lower end thereof being fixed on an upper surface of said fixing seat;

a reflection mirror, fixed at an upper end of said supporting arm and corresponding to a lens of said projection apparatus, images provided from said lens of said projection apparatus being reflected onto a screen through said reflection mirror; and a set of sheet sliding rails, extended from a lower surface of said fixing seat, wherein said sheet sliding rails on fixing seat and said sliding grooves in said saddle pad are respectively dovetail pieces and grooves.

13. The wall hanging apparatus according to claim 12, wherein said sliding rails are slid on a saddle pad, a set of sliding grooves formed by sheets is disposed on a surface of said saddle pad for said sliding rails to be slid and stayed therein.

14. The wall hanging apparatus according to claim 13, wherein an opening is opened at an upper end of said sliding grooves in said saddle pad and a lower end thereof is closed.

15. The wall hanging apparatus according to claim 12, wherein a ball-and-socket joint is fixed on the upper end of said supporting arm and an adjusting rod is extended from a surface of a ball of said ball-and-socket joint for fixing said reflection mirror to allow said reflection mirror to make a multi-angular rotation adjustment through said ball-and-socket joint.

16. The wall hanging apparatus according to claim 15, wherein a socket of said ball-and-socket joint is formed by clamping and fixing an upper clamping sheet and a lower clamping sheet at the upper end of said supporting arm to allow said ball to be rotated in said socket.

* * * * *